(12) United States Patent
Lundeen et al.

(10) Patent No.: US 11,560,079 B2
(45) Date of Patent: Jan. 24, 2023

(54) AUTOMATED SYSTEMS AND METHODS FOR TRANSFERRING PACKAGES FROM A VEHICLE TO A CURBSIDE LOCKER BOX

(71) Applicant: Ford Global Technologies, LLC, Dearborn, MI (US)

(72) Inventors: Kurt Lundeen, Wixom, MI (US); Geoffrey Horowitz, Farmington Hills, MI (US); Yifan Chen, Ann Arbor, MI (US); Smruti Panigrahi, Farmington Hills, MI (US); Pavithra Madhavan, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/172,534

(22) Filed: Feb. 10, 2021

(65) Prior Publication Data
US 2022/0250527 A1 Aug. 11, 2022

(51) Int. Cl.
*B60P 1/38* (2006.01)
*B60P 1/00* (2006.01)
*B60P 3/00* (2006.01)

(52) U.S. Cl.
CPC ............. *B60P 1/38* (2013.01); *B60P 1/006* (2013.01); *B60P 3/007* (2013.01)

(58) Field of Classification Search
CPC .............. B60P 1/38; B60P 1/006; B60P 3/007
See application file for complete search history.

(56) References Cited

U.S. PATENT DOCUMENTS

| | | | |
|---|---|---|---|
| 9,519,882 B2* | 12/2016 | Galluzzo | B25J 9/1692 |
| 10,351,347 B2* | 7/2019 | Luckay | G06Q 10/083 |
| 10,624,484 B1* | 4/2020 | Mountford | A47B 57/583 |
| 10,698,400 B2* | 6/2020 | Ewert | H04L 12/2803 |
| 10,730,626 B2* | 8/2020 | Gil | G08G 5/025 |
| 10,929,802 B2* | 2/2021 | Orth | B60P 1/6418 |
| 11,040,828 B1* | 6/2021 | Ward | B60P 1/04 |
| 11,091,080 B1* | 8/2021 | Saing | B60P 1/38 |
| 2014/0341695 A1* | 11/2014 | Girtman | B65G 67/24 414/797 |

(Continued)

FOREIGN PATENT DOCUMENTS

WO 2020028241 A1 2/2020

OTHER PUBLICATIONS

Martin Joerss et al, "Parcel delivery The future of last mile", McKinsey & Company, Travel Transport and Logistics, Sep. 2016, 32 pages.

*Primary Examiner* — Saul Rodriguez
*Assistant Examiner* — Ashley K Romano
(74) *Attorney, Agent, or Firm* — Brandon Hicks; Eversheds Sutherland (US) LLP

(57) ABSTRACT

Systems and methods for delivering a package to a curbside receptacle are provided. A delivery window of a vehicle may be aligned with a curbside receptacle. A carousel within the vehicle may be moved, e.g., rotated, within the vehicle to align a target compartment with the delivery window. A conveyor arm slidably coupled to the delivery window is then extended and aligned with the target compartment, and a target package within the target compartment is ejected from the target compartment onto the conveyor arm, e.g., via a plunger mechanism. The conveyor arm then transfers the target package to curbside receptacle.

19 Claims, 11 Drawing Sheets

(56) References Cited

U.S. PATENT DOCUMENTS

| | | |
|---|---|---|
| 2015/0321595 A1 | 11/2015 | Hempsch et al. |
| 2018/0330325 A1* | 11/2018 | Sibley .................. B66F 9/0755 |
| 2019/0362295 A1* | 11/2019 | Kanitz ..................... B60S 1/64 |
| 2020/0134561 A1 | 4/2020 | Hedges |
| 2020/0198515 A1* | 6/2020 | Eichstedt .................. B60P 1/52 |
| 2020/0209865 A1* | 7/2020 | Jarvis ............... G06Q 10/08355 |
| 2020/0290494 A1* | 9/2020 | Key .......................... B60P 1/36 |
| 2020/0385207 A1* | 12/2020 | Godwin ................ B60P 1/6481 |
| 2021/0072754 A1* | 3/2021 | Senske .................. B65G 67/20 |

\* cited by examiner

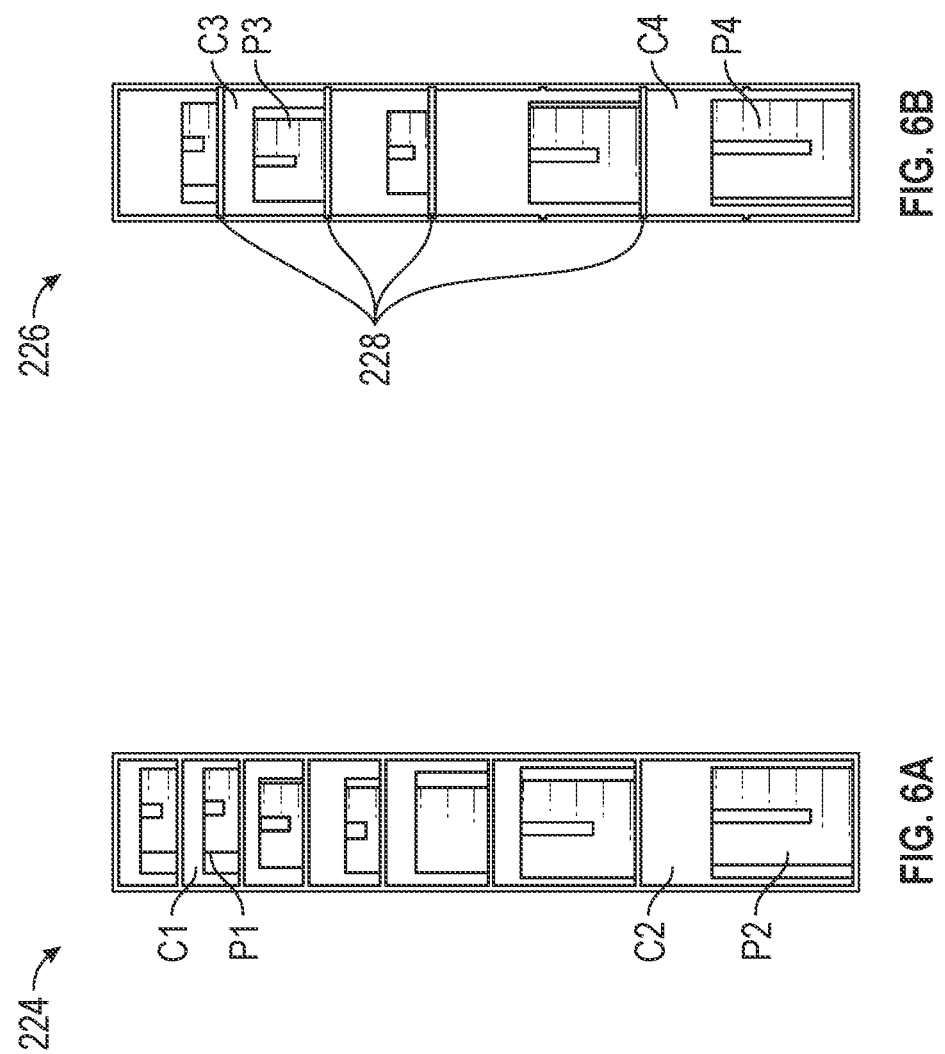

AUTOMATED SYSTEMS AND METHODS FOR TRANSFERRING PACKAGES FROM A VEHICLE TO A CURBSIDE LOCKER BOX

BACKGROUND

E-commerce continues to grow globally, with last-mile delivery accounting for an ever-increasing portion of shipping expenses. Unfortunately, packages are often stolen, with package theft especially high in urban areas. It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIGS. 6A and 6B illustrate alternative exemplary compartments of a vehicle in accordance with the principles of the present disclosure.

DETAILED DESCRIPTION

Overview

Figure 1:
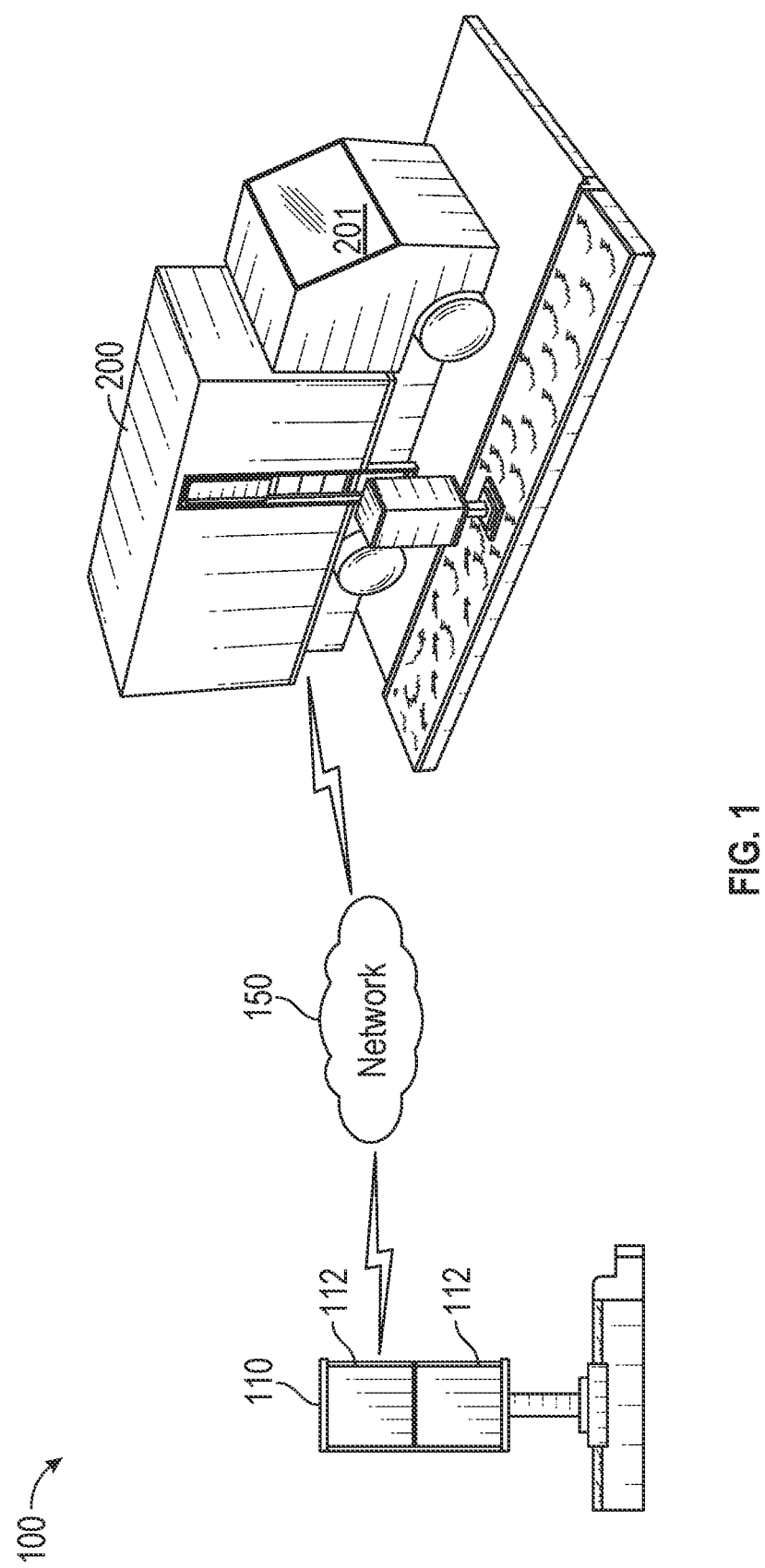
FIG. 1 illustrates a system for delivering a package to a curbside receptacle in accordance with the principles of the present disclosure.

Disclosed is a system installed in a package delivery vehicle that enables packages to be automatically transferred to a curbside receptacle, e.g., a locker box. First, packages are stored in compartmentalized cabinets circulating on a carousel inside the vehicle. As the vehicle approaches its destination, the carousel cycles the cabinets to bring the package into position behind its respective door. As the vehicle approaches the locker box, it uses onboard sensors and processors to iteratively identify the locker box, estimate the locker's relative pose, plan a trajectory that would bring the vehicle to the desired relative pose, and execute the planned trajectory. The vehicle may then communicate with the locker box, provide an access code, and request the locker to open its door. If the door does not open, the process may terminate and the vehicle may move on to the next delivery. If the door opens, the onboard sensors and processors may identify suitable locations in the locker box for the package. If no suitable locations exist, the process may terminate and the vehicle may move on to the next delivery.

The conveyor may then pivot and move to the package door. The package door may then open. The package may be ejected from the cabinet using a pushing plunger and pulling from the conveyor. Once the onboard sensors and processor determine that the package has sufficiently exited the vehicle, the conveyor may stop and the package door may be closed. The onboard sensors and processors may then plan a trajectory to move the package from its current location to the desired destination in the locker box. The conveyor arms may then move to reach the locker box. Finally, the conveyor may transfer the package into the locker box.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination to form additional hybrid implementations of the present disclosure. For example, any of the functionality described with respect to a particular device/component may be performed by another device/component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art.

Referring now to FIG. 1, system 100 for delivering one or more packages to designated receptacle is provided. System 100 may include vehicle 200, which may communicate with receptacle 110, e.g., a curbside lockbox, via network 150. Network 150 may include any one, or a combination of networks, such as a local area network (LAN), a wide area network (WAN), a telephone network, a cellular network, a wireless network, and/or private/public networks, such as the Internet. For example, network 150 may support communication technologies, such as TCP/IP, Bluetooth, cellular, near-field communication (NFC), Wi-Fi, Wi-Fi direct, machine-to-machine communication, man-to-machine communication, and/or visible light communications.

Some or all portions of the wireless communication link that supports communications between vehicle 200 and a communication device, such as a router, for example, that may be included in network 150, may be implemented using various types of wireless technologies, such as Bluetooth®, ZigBee®, or near-field-communications (NFC), cellular, Wi-Fi, Wi-Fi direct, machine-to-machine communication, man-to-machine communication, and/or a vehicle-to-everything (V2X) communication.

Receptacle 110 may be a curbside locker disposed in an area accessible by vehicle 200, as described in further detail below. Receptacle 110 may include one or more compartments sized and shaped for receiving one or more packages, each compartment having a door, e.g., door 112 as shown in FIG. 1. Receptacle 110 may include a transceiver for communicating with vehicle 200 and a processor for processing data received from vehicle 200. For example, the transceiver may receive an access code from vehicle 200, and the processor may determine whether the access code is acceptable. If the access code is accepted, the processor will cause the corresponding receptacle door to open to receive the package. If the access code is rejected, the processor may transmit a notification to vehicle 200. Alternatively, if the access code is rejected, the processor may do nothing, and receptacle doors will remain closed.

Vehicle 200 may be a manually driven vehicle (e.g., no autonomy) and/or configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4. A vehicle having a Level-0 autonomous automation may not include autonomous driving features. An autonomous vehicle (AV) having Level-1 autonomy may include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation. Level-3 autonomy in a vehicle can provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomous vehicles can operate independently from a human driver, but may still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls.

Vehicle 200 may have control module 201 operatively coupled to a transceiver for communicating with receptacle 110. Moreover, control module 201 may receive data indicative of the identity and location of a target receptacle, and plan a navigation route to the target receptacle. As vehicle 200 approaches the target receptacle, e.g., receptacle 110, it may use onboard sensors and processors to iteratively identify target receptacle, estimate the target receptacle's relative pose, plan a trajectory that would bring vehicle 200 to the desired relative pose, and execute the planned trajectory. Vehicle 200 may then communicate with the target receptacle, provide an access code, and request the target receptacle to open its door, e.g., door 112. If the receptacle door does not open, the process may terminate and vehicle 200 may move on to the next delivery. If the receptacle door opens, the onboard sensors and processors may identify suitable locations in the target receptacle to deliver the package. If no suitable locations exist or can be found, the process may terminate and vehicle 200 may move on to the next delivery. Additionally, control module 201 may be communicatively coupled to the components of vehicle 200 described herein, e.g., carousel 202, conveyor arm 204, door 212, retractable arm 210, plungers 216, etc., to instruct the components to perform the functions ascribed to them.

Figure 2A:
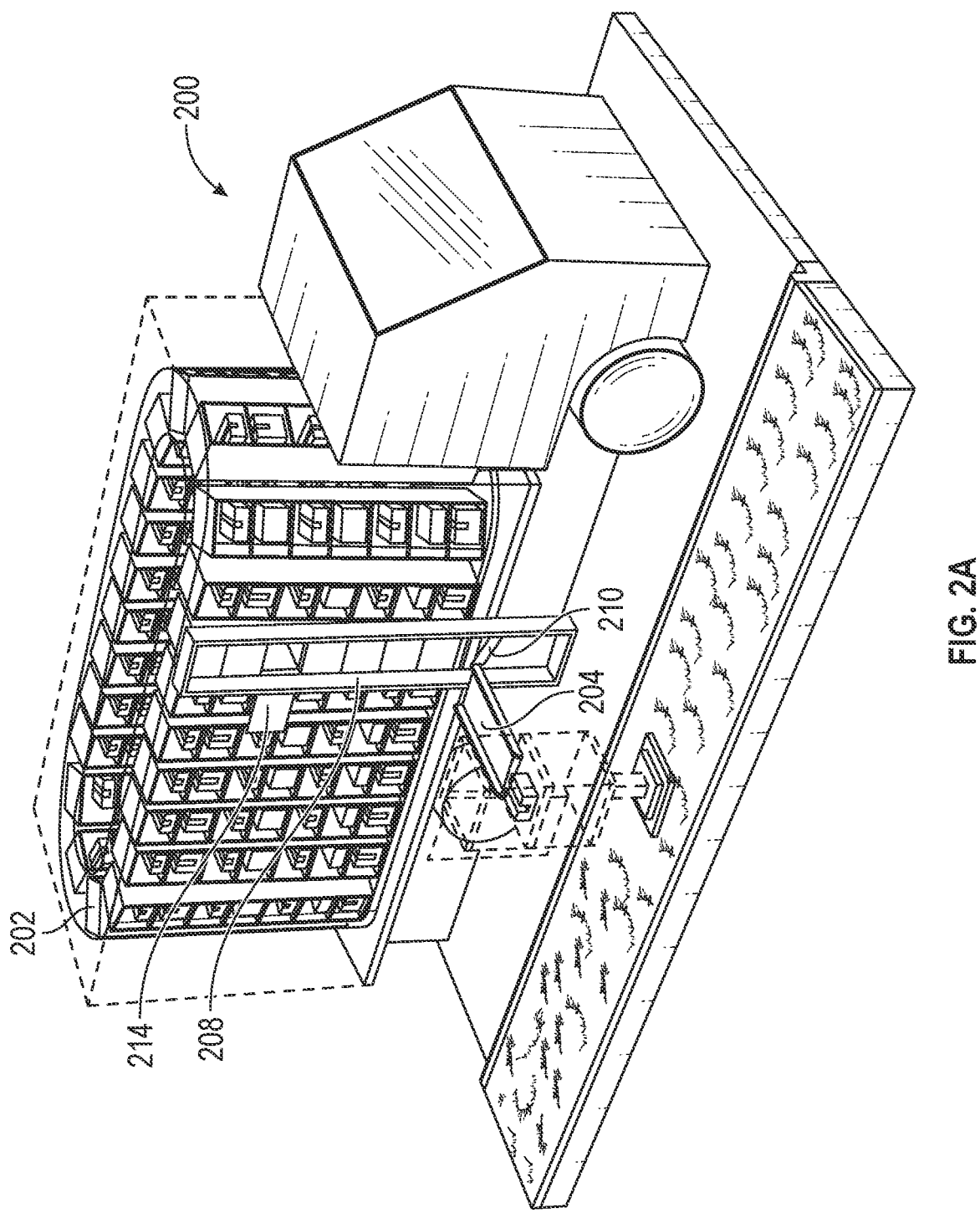
FIGS. 2A to 2C illustrate a delivery vehicle constructed in accordance with the principles of the present disclosure.
Figure 2B:
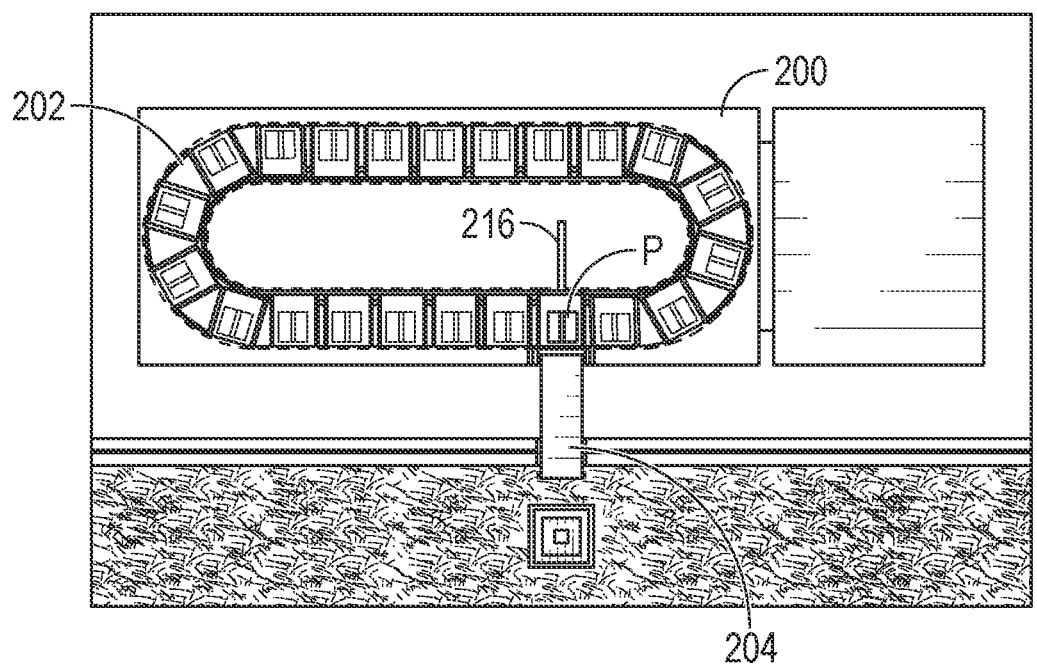
Figure 2C:
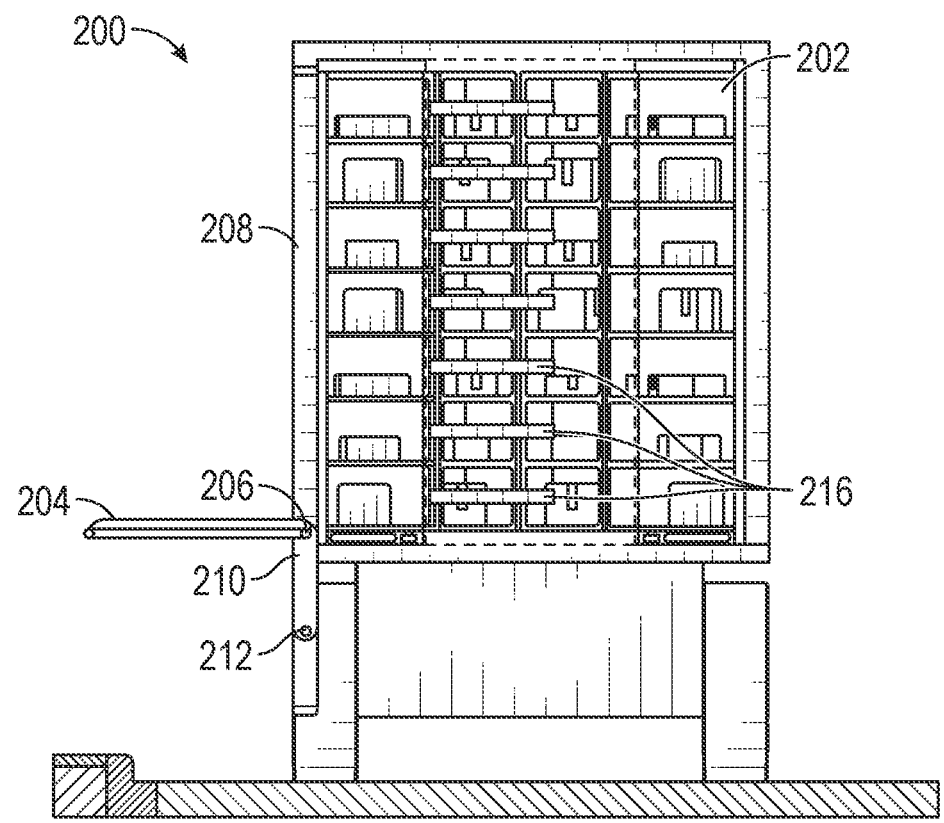

Referring now to FIGS. 2A to 2C, vehicle 200 is described in further detail. Vehicle 200 may include carousel 202, e.g., disposed within a cargo box of vehicle 200. Carousel 202 may include an array of vertically stacked compartments, e.g., cabinets, each sized and shaped to store one or more packages therein. The package(s) of a given compartment may be associated with a target receptacle for delivery therein. Each compartment may include its own door, e.g., compartment door 214. In one embodiment, each compartment of the cabinet may be uniform in size.

Alternatively, as shown in FIGS. 6A and 6B, the compartments of a cabinet may vary in size. For example, the varying sizes of each compartment of cabinet 224 may be fixed as shown in FIG. 6A, such that the compartments increase in size in the direction towards the ground. Thus, compartment C1 sized and shaped to receive a package the size of package P1 may be smaller than compartment C2 sized and shaped to receive a package of the size of package P2. As will be understood by a person having ordinary skill in the art, the varying fixed compartment sizes may be distributed in other patterns, e.g., decreasing in size in the direction towards the ground, or another random distribution.

Alternatively, the compartments of a cabinet, e.g., cabinet 226, may be formed by equally spaced, removable shelves 228, as shown in FIG. 6B. Accordingly, shelves 228 may be removed to create a larger compartment or added to create a smaller compartment. Thus, compartment C3 sized and shaped to receive a package the size of package P3 may be smaller than compartment C4 sized and shaped to receive a package of the size of package P4.

Referring again to FIGS. 2A to 2C, carousel 202 may have a circular, e.g., elliptical shape, such that carousel 202 may rotate within the cargo box vehicle 200, e.g., along a track integrated within vehicle 200. In addition, vehicle 200 may include delivery window 208, which may extend vertically along a side of vehicle 200. Delivery window 208 may have a size corresponding to the size of the cabinets of carousel 202, such that carousel 202 may rotate so that a cabinet may be aligned with delivery window 208, e.g., via alignment sensors. As described above, each compartment of the cabinet of carousel 202 may have its own door. Additionally or alternatively, delivery window 208 may have a door corresponding to each compartment of a cabinet of carousel 202. In one embodiment, delivery window 208 may be fixed relative to the cargo box of vehicle 200.

In some embodiments, vehicle 200 need not include a cargo box, such that carousel 200 is exposed, and accordingly weatherproof. In such an embodiment, delivery window 208 may be horizontally slidable along a side of vehicle 200, e.g., on a track coupled to vehicle 200. For example, after vehicle 200 comes in proximity to receptacle 110 and stops, delivery window 208 may not be in perfect alignment with receptacle 110. Accordingly, delivery window 208 may slide along the track until it is aligned with receptacle 110, e.g., via alignment sensors. Carousel 200 may then rotate until the target cabinet having the target compartment is aligned with delivery window 208.

Vehicle 200 also may include conveyor arm 204, which may include a conveyor belt for moving a package thereon. Conveyor arm 204 may be slidably coupled to delivery window 208 such that conveyor arm 204 may move vertically along delivery window 208 to align vertically with a compartment of the cabinet of carousel 202. Moreover, conveyor arm 204 may be slidably coupled to delivery window 208 via retractable arm 210. For example, a proximal end of retractable arm 210 may be pivotally and slidably coupled to delivery window 208 at connection 212, and a distal end of retractable arm 210 may be pivotally coupled to conveyor arm 204 at connection 206. Accordingly, conveyor arm 204 may transition between a retracted position (e.g., a stowed position) and an extended position (e.g., delivery position) via connection 206, and conveyor arm 204 may move vertically along delivery window 208 via retractable arm 210 and connection 212. In addition, retractable arm 210 may pivot about connection 212 to extend conveyor arm 204 away from vehicle 200 and closer to receptacle 110 as shown in FIG. 2A.

Vehicle 200 further may include a plunger mechanism for ejecting the package(s) within the target compartment onto conveyor arm 204. For example, as shown in FIG. 2C, vehicle 200 may include a plurality of vertically stacked plungers 216, each aligned with the rear of the compartments of the cabinet of carousel 202. Plungers 216 may include a flat body that extends parallel with the compartment door, and sized to fit within the compartment such that as a plunger moves toward the compartment door, the plunger will push the package(s) therein out of the compartment and onto conveyor arm 204. Alternatively, the plunger mechanism may include a single plunger 216 which may translate vertically within vehicle 200 to align with the target compartment, such that only one plunger is needed to ejected the packages from the corresponding compartments.

Figure 3:
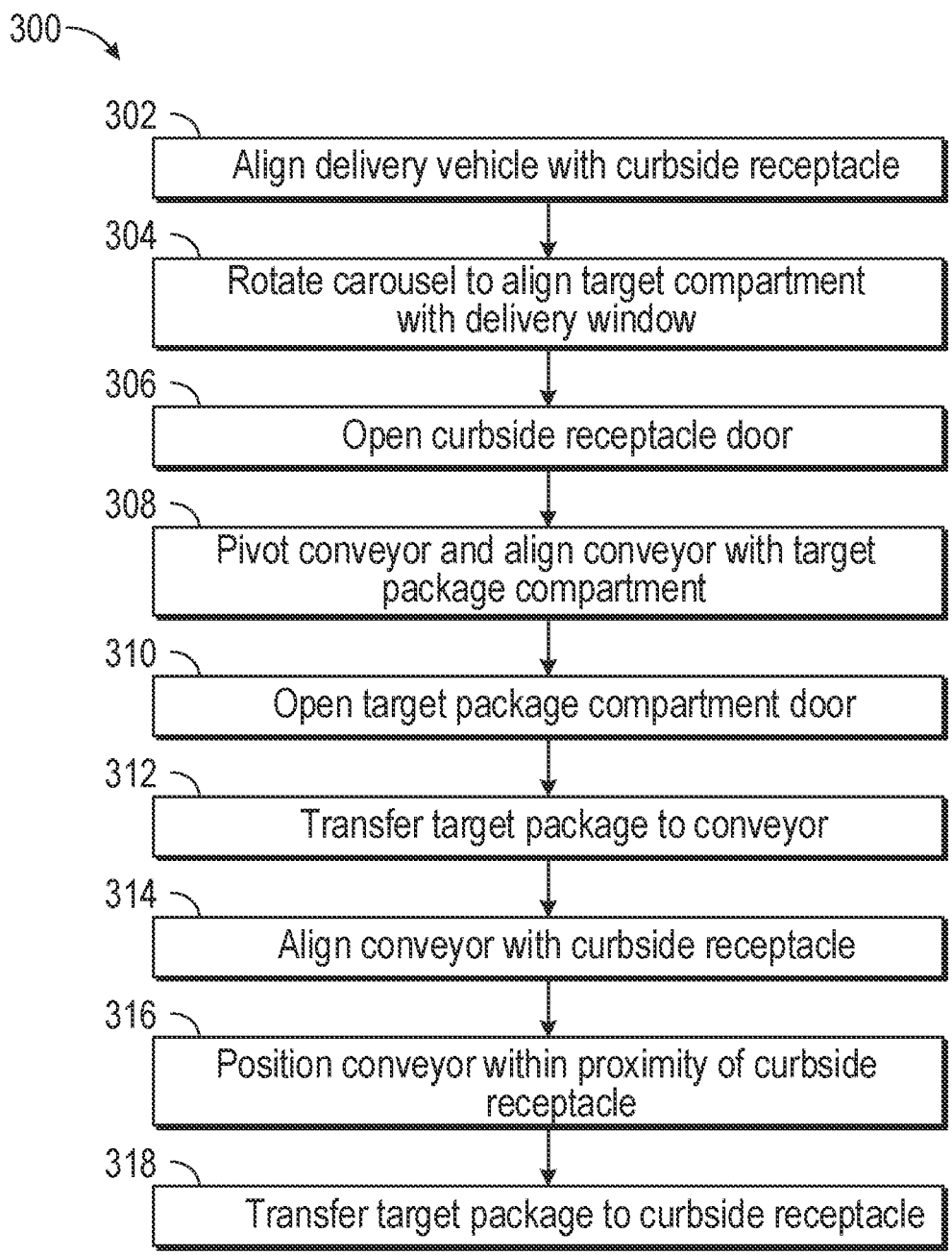
FIG. 3 is a flow chart illustrating exemplary steps for delivering a package to a curbside receptacle in accordance with the principles of the present disclosure.
Figure 4A:
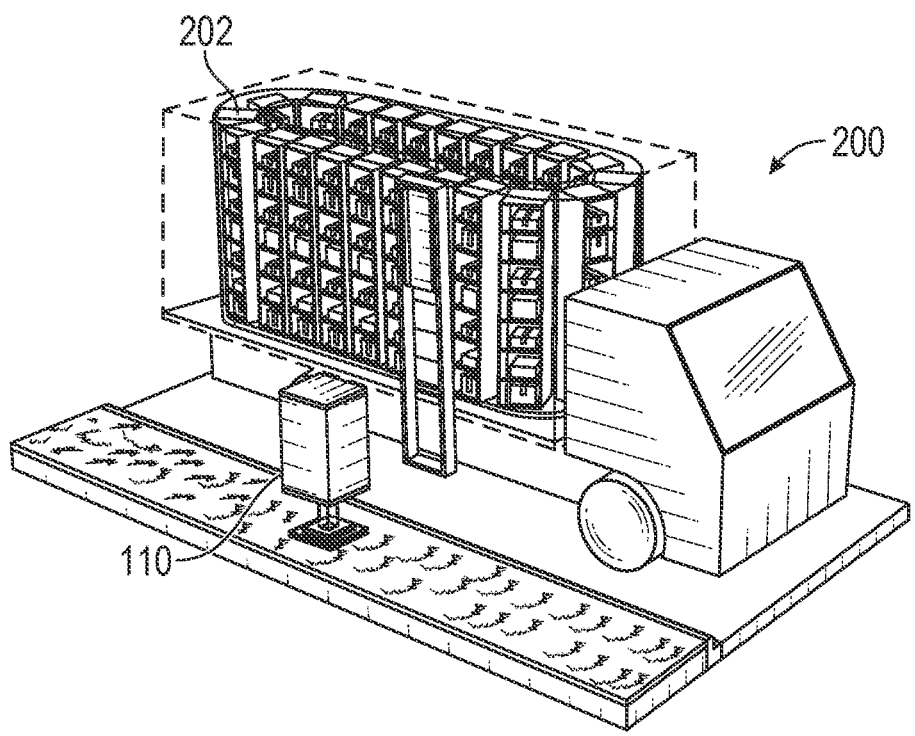
FIGS. 4A to 4I illustrate exemplary steps for delivering a package to a curbside receptacle in accordance with the principles of the present disclosure.

Referring now to FIG. 3, an exemplary method 300 for delivering one or more packages to receptacle 110 is provided. Some of the steps of method 300 may be further elaborated by referring to FIGS. 4A to 4I. As vehicle 200 approaches receptacle 110, e.g., a curbside lock box, at step 302, the sensors onboard vehicle 200 may locate receptacle 110, such that vehicle 200 may move to align delivery window 208 with receptacle 110, as shown in FIG. 4A. For example, onboard sensors and processors may iteratively identify receptacle 110, estimate the relative pose of receptacle 110, plan a trajectory that would bring vehicle 200 to the desired relative pose, and execute the planned trajectory to align delivery window 208 with receptacle 110. Alignment sensors onboard vehicle 200 may be used to facilitate alignment with receptacle 110.

Figure 4B:
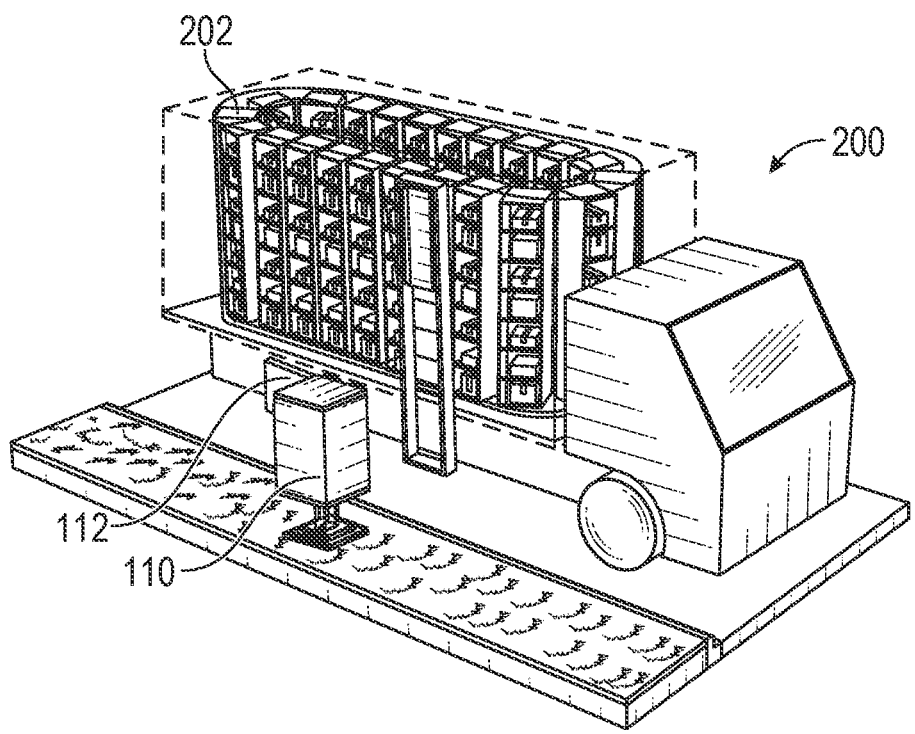
Figure 4C:
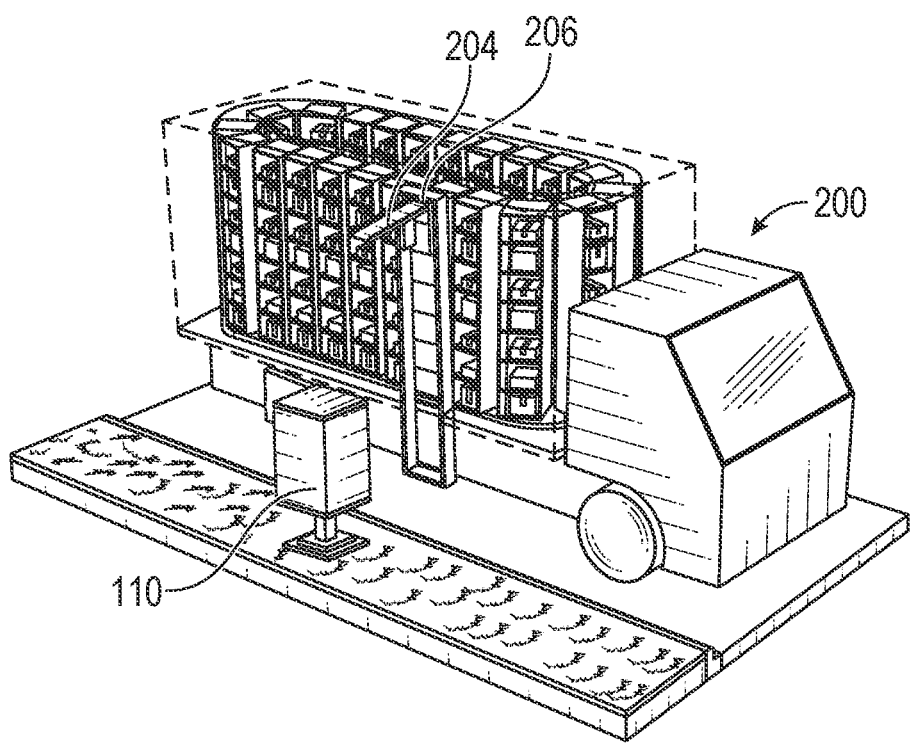
Figure 4D:
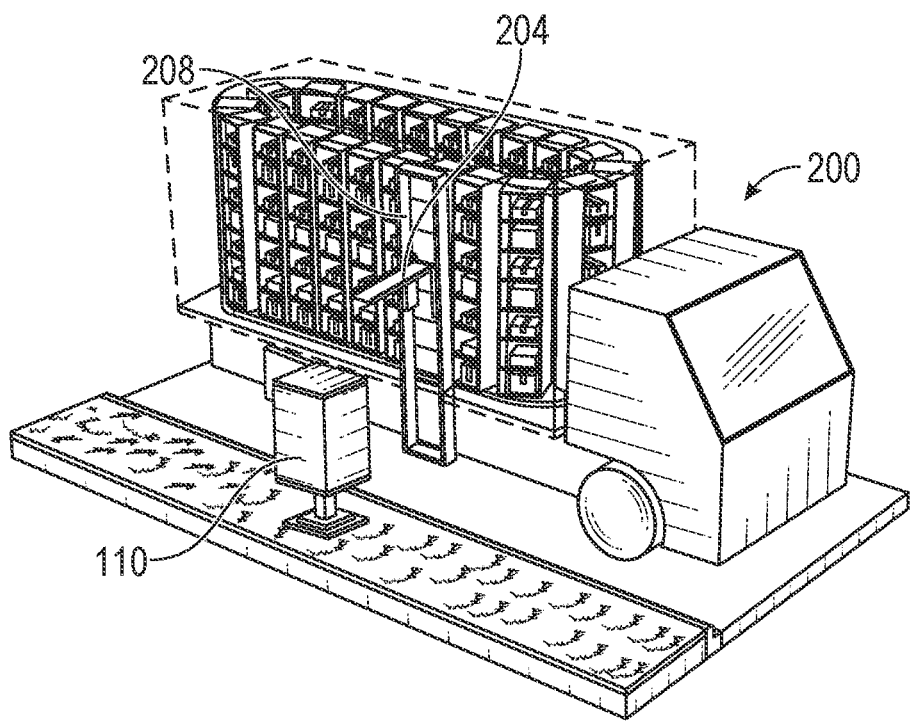
Figure 4E:
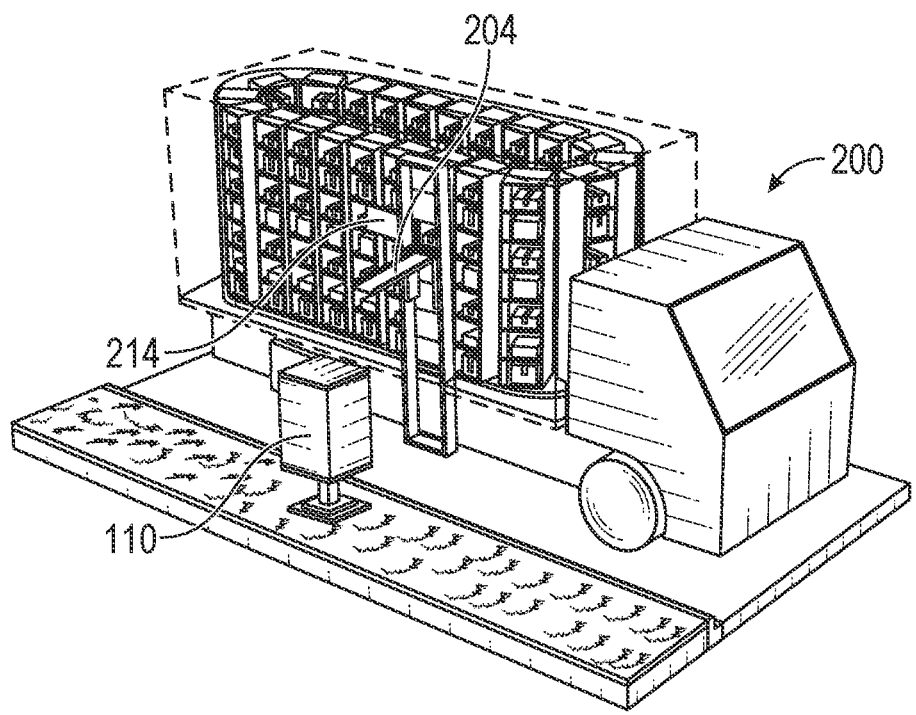

At step 304, carousel 202 may rotate within vehicle 200 until the target compartment is aligned with delivery window 208. Vehicle 200 may then transmit an access code to receptacle 110, e.g., a request for receptacle 110 to open door 112. If the access code is accepted, at step 306, door 112 of receptacle 110 may open, as shown in FIG. 4B. At step 308, conveyor arm 204 may transition from a retracted stowed position to an extended delivery position, e.g., pivot about connection 206, as shown in FIG. 4C, and slide along delivery window 208 until conveyor arm 204 is aligned with the target compartment, as shown in FIG. 4D. At step 310, door 214 of the target compartment may open, as shown in FIG. 4E.

Figure 4F:
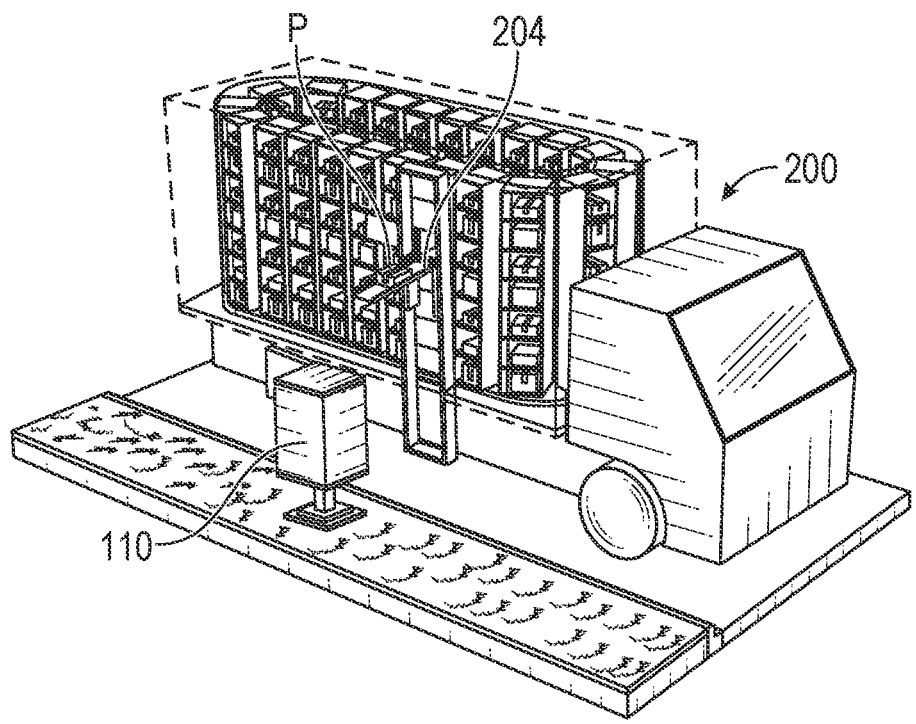
Figure 4G:
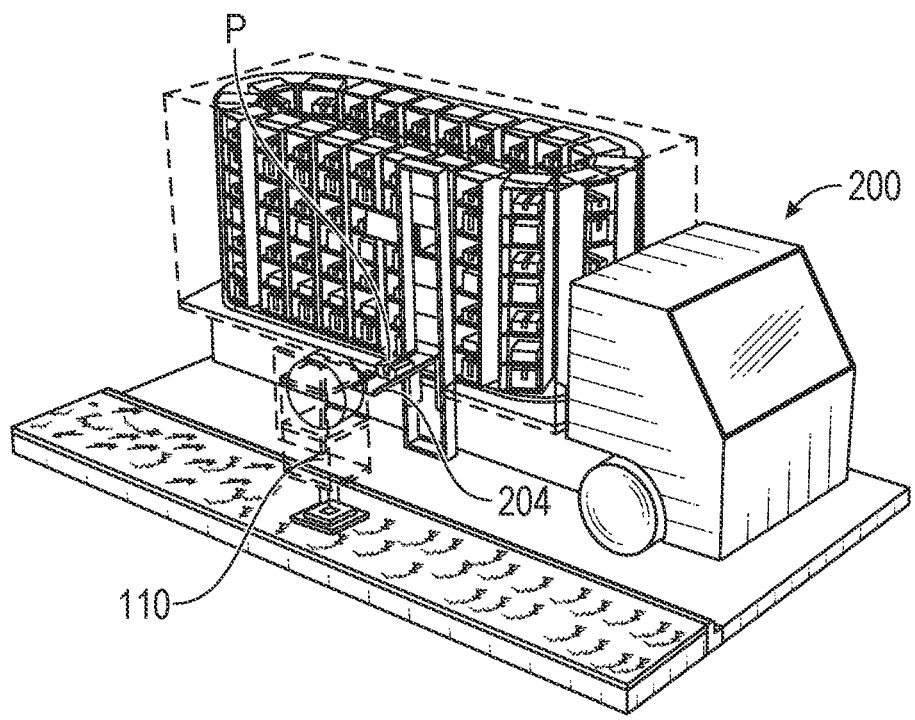
Figure 4H:
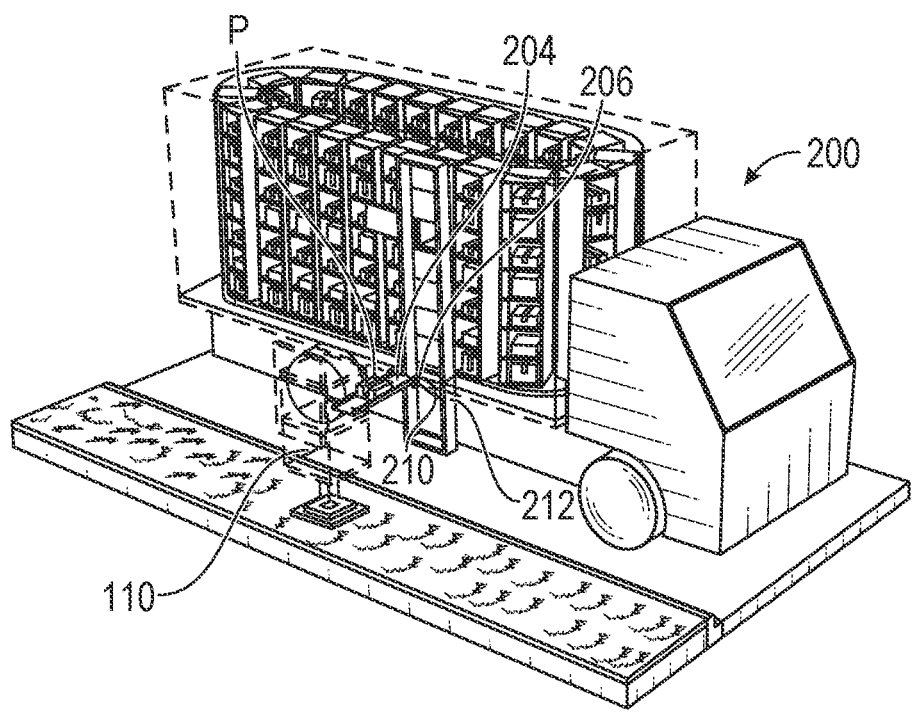
Figure 4I:
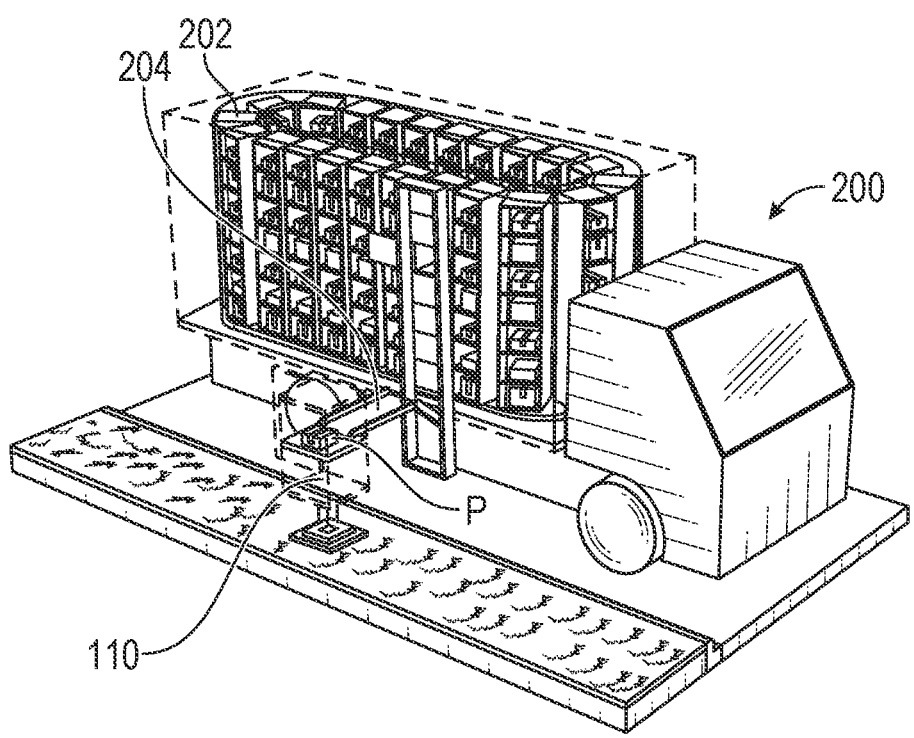

At step 312, plunger mechanism 216 may be used to transfer package P from the target compartment onto conveyor arm 204, as shown in FIG. 4F. Additionally, the conveyor belt of conveyor arm 204 may be actuated to facilitate transfer of package P onto conveyor arm 204. At step 314, conveyor arm 204 may slide along delivery window 208 to align conveyor arm 204 with the opening of receptacle 110, as shown in FIG. 4G. At step 316, conveyor arm 204 may be positioned within proximity of the opening of receptacle 110. For example, the proximal end of retractable arm 210 may pivot about connection 212, while conveyor arm 204 pivots about connection 206 to maintain a planar surface of conveyor 204 to maintain package P thereon, thereby extending conveyor arm 204 towards receptacle 110, as shown in FIG. 4H. At step 318, the conveyor belt of conveyor 204 may be actuated to transfer package P into receptacle 110, as shown in FIG. 4I. Door 112 of receptacle 110 may then close to secure package P therein, and conveyor arm 204 may be return to its retracted position and door 212 may close to complete the delivery process. If additional packages from additional compartments need to be delivered to the same receptacle, the steps described herein may be repeated.

Figure 5A:
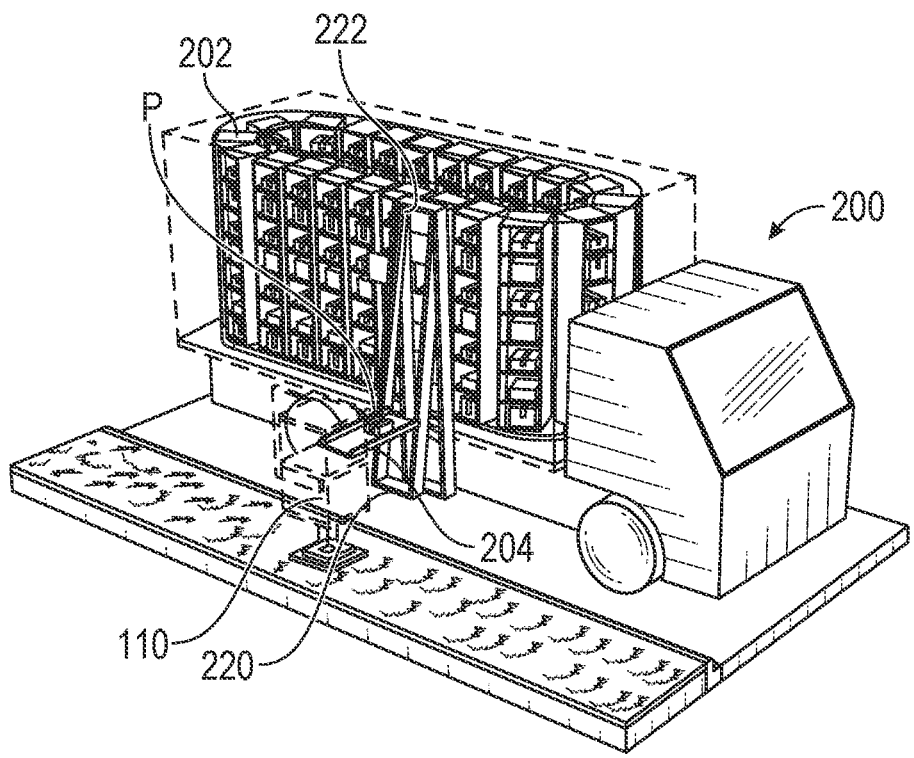
FIGS. 5A and 5B illustrate alternative exemplary steps for delivering a package to a curbside receptacle in accordance with the principles of the present disclosure.
Figure 5B:
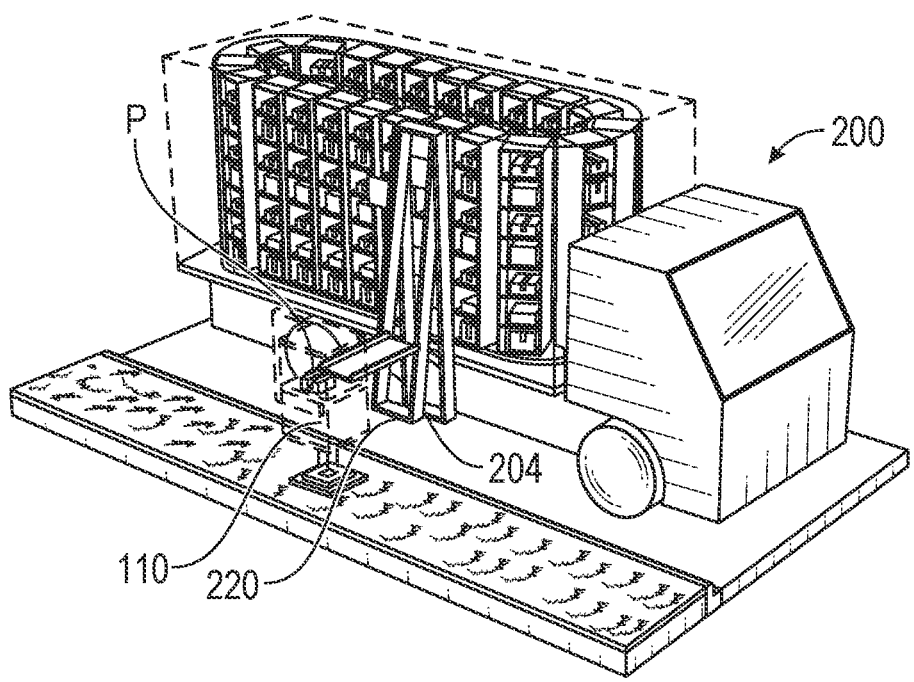

Referring now to FIGS. 5A and 5B, an alternative method for positioning conveyor arm 204 within proximity of the opening of receptacle 110 at step 316 of method 300, is described. Here, instead of retractable arm 210, vehicle 200 may include retractable arm 220. The proximal end of retractable arm 220 may be pivotally coupled to delivery window 208 at connection 222, as shown in FIG. 5A. Additionally, conveyor arm 204 may be slidably and pivotally coupled to retractable arm 220, such that conveyor arm 204 may slide vertically along retractable arm 220. Accordingly, at step 316, retractable arm 220 may pivot about connection 222 to position conveyor arm 204 within proximity of the opening of receptacle 110, as shown in FIG. 5A, and at step 318, the conveyor belt of conveyor 204 may be actuated to transfer package P into receptacle 110, as shown in FIG. 5B.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, and/or wireless data links) through a network, both perform tasks. In a distributed system environment, program modules may be located in both the local and remote memory storage devices.

Further, where appropriate, the functions described herein may be performed in one or more of hardware, software, firmware, digital components, or analog components. For example, one or more application specific integrated circuits (ASICs) may be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed:

1. A vehicle for delivering a package to a curbside receptacle, the vehicle comprising:
    a delivery window;
    a carousel comprising a plurality of vertically-stacked compartments each sized and shaped to store a package, the carousel configured to move within the vehicle to align a target compartment of the plurality of vertically-stacked compartments with the delivery window;
    a conveyor arm slidably coupled to the delivery window and configured to transition between a retracted stowed position and an extended delivery position, the conveyor arm further configured to slide along the delivery window to align with the target compartment; and
    a plunger mechanism configured to translate vertically within the vehicle to transfer a target package within the target compartment through the delivery window and to push the target package onto the conveyor arm, wherein the plunger mechanism comprises a plurality of vertically-stacked plungers, each plunger of the vertically-stacked plurality of plungers is configured to align with a respective compartment of the plurality of the vertically-stacked compartments,
    wherein the conveyor arm is configured to transfer the target package to the curbside receptacle.

2. The vehicle of claim 1, wherein the carousel is configured to rotate within the vehicle to align the target compartment with the delivery window.

3. The vehicle of claim 1, wherein the conveyor arm comprises a conveyor belt configured to transfer the target package to the curbside receptacle.

4. The vehicle of claim 1, wherein the conveyor arm is slidably coupled to the delivery window via a retractable arm, the retractable arm configured to extend to position the conveyor adjacent to the curbside receptacle.

5. The vehicle of claim 4, wherein a proximal end of the retractable arm is pivotally and slidably coupled to the delivery window, and a distal end of the retractable arm is pivotally coupled to the conveyor arm.

6. The vehicle of claim 4, wherein a proximal end of the retractable arm is pivotally coupled to a top of the delivery window, wherein a distal end of the retractable arm is configured to pivot away from a bottom of the delivery window, and wherein the conveyor arm is pivotally and slidably coupled to the retractable arm.

7. The vehicle of claim 1, wherein the plurality of vertically-stacked compartments are uniform in size.

8. The vehicle of claim 1, wherein the plunger mechanism comprises a plunger configured to move vertically within the vehicle to align with the target compartment.

9. The vehicle of claim 1, wherein the target compartment comprises a door, the door configured to open when the target compartment is aligned with the delivery window.

10. The vehicle of claim 1, further comprising a control module configured to receive curbside receptacle location data, the control module comprising instructions that, when executed by a processor of the control module, generates a navigation route to the curbside receptacle based on the curbside receptacle location data.

11. The vehicle of claim 1, further comprising a control module configured to receive curbside receptacle location data, the control module comprising instructions that, when executed by a processor of the control module, identifies the target compartment based on the curbside receptacle location data.

12. The vehicle of claim 1, further comprising a control module configured to transmit an access code from the vehicle to the curbside receptacle, the access code comprising a request to cause a door of the curbside receptacle to open.

13. The vehicle of claim 1, further comprising one or more sensors configured detect the curbside receptacle, wherein the vehicle is configured to align the delivery window with the curbside receptacle based on the detection of the curbside receptacle.

14. A method for delivering a package to a curbside receptacle, the method comprising:
    aligning a delivery window of a vehicle with a curbside receptacle;
    moving a carousel within the vehicle to align a target compartment of a plurality of vertically-stacked compartments with the delivery window;
    transitioning a conveyor arm slidably coupled to the delivery window from a retracted stowed position and an extended delivery position;
    aligning the conveyor arm with the target compartment;
    transferring a target package within the target compartment through the delivery window and to push the target package onto the conveyor arm via a plunger mechanism configured to translate vertically within the vehicle, wherein the plunger mechanism comprises a plurality of vertically-stacked plungers, each plunger of the plurality of vertically-stacked plungers aligned with a respective compartment of the plurality of the vertically-stacked compartments; and
    transferring the target package from the conveyor arm to the curbside receptacle.

15. The method of claim 14, wherein moving the carousel within the vehicle comprises rotating the carousel within the vehicle to align the target compartment with the delivery window.

16. The method of claim 14, wherein transferring the target package from the conveyor arm to the curbside receptacle comprises extending the conveyor arm toward the curbside receptacle via a retractable arm coupled to the conveyor arm and the delivery window.

17. The method of claim 14, further comprising opening a door of the target compartment prior to transferring the target package within the target compartment through the delivery window onto the conveyor arm.

18. The method of claim 14, further comprising transmitting an access code from the vehicle to the curbside receptacle, the access code comprising a request to cause a door of the curbside receptacle to open.

19. The method of claim 14, further comprising:
    receiving curbside receptacle location data; and
    planning a navigation route to align the delivery window of the vehicle with the curbside receptacle.

* * * * *